(12) United States Patent
Koops et al.

(10) Patent No.: US 8,308,890 B2
(45) Date of Patent: Nov. 13, 2012

(54) METHOD OF APPLYING A DURABLE PROCESS MARK TO A PRODUCT, MORE PARTICULARLY GLASS

(75) Inventors: Arne Koops, Neu-Lankau (DE); Sven Reiter, Hamburg (DE); Bernd Bunde, Hamburg (DE); Olaf Postel, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/781,338

(22) Filed: May 17, 2010

(65) Prior Publication Data
US 2011/0081551 A1 Apr. 7, 2011

(30) Foreign Application Priority Data

Jun. 19, 2009 (DE) .......................... 10 2009 029 903

(51) Int. Cl.
| | | |
|---|---|---|
| *B44C 1/165* | (2006.01) | |
| *B44C 1/22* | (2006.01) | |
| *B29C 65/16* | (2006.01) | |
| *B32B 37/14* | (2006.01) | |
| *B32B 37/24* | (2006.01) | |
| *B32B 37/26* | (2006.01) | |
| *B29C 65/38* | (2006.01) | |
| *B32B 38/18* | (2006.01) | |
| *B32B 37/02* | (2006.01) | |

(52) U.S. Cl. ....................... 156/272.8; 156/230; 156/234
(58) Field of Classification Search ............... 156/272.8, 156/230, 234
See application file for complete search history.

(56) References Cited

U.S. PATENT DOCUMENTS

| | | | | |
|---|---|---|---|---|
| 5,017,547 A | * | 5/1991 | DeBoer | 503/227 |
| 5,139,598 A | * | 8/1992 | Chou et al. | 428/32.81 |
| 5,194,237 A |   | 3/1993 | Cliche et al. | |
| 5,215,864 A | * | 6/1993 | Laakmann | 430/293 |
| 5,328,727 A | * | 7/1994 | Kashio et al. | 427/595 |
| 5,578,416 A | * | 11/1996 | Tutt | 430/270.18 |
| 5,685,939 A | * | 11/1997 | Wolk et al. | 156/234 |
| 5,851,335 A | * | 12/1998 | Budnik et al. | 156/257 |
| 6,068,692 A | * | 5/2000 | Zimmer | 106/426 |
| 6,114,088 A | * | 9/2000 | Wolk et al. | 430/273.1 |
| 6,177,151 B1 | * | 1/2001 | Chrisey et al. | 427/596 |
| 6,228,555 B1 | * | 5/2001 | Hoffend et al. | 430/200 |
| 6,734,138 B2 | * | 5/2004 | Suzuki et al. | 503/201 |

(Continued)

FOREIGN PATENT DOCUMENTS

DE 101 52 073 A 5/2003

(Continued)

OTHER PUBLICATIONS

Family Search for WO 03/080335—published on Oct. 2, 2003.*

(Continued)

*Primary Examiner* — Sonya Mazumdar
(74) *Attorney, Agent, or Firm* — Norris McLaughlin & Marcus, P.A.

(57) ABSTRACT

A method of applying a durable process mark to a glass article using a laser. A transfer sheet is applied to the glass substrate, the transfer sheet includes a carrier layer with a first adhesive layer, adhered partially to a bottom side of the carrier layer. On the face of the carrier layer there are a first and a second pigment layer. The transfer sheet is lased, forming a durable process mark in the glass article.

18 Claims, 4 Drawing Sheets

U.S. PATENT DOCUMENTS

| | | | |
|---|---|---|---|
| 6,764,803 B2 | 7/2004 | Koops et al. | |
| 6,766,764 B1* | 7/2004 | Chrisey et al. | 118/726 |
| 6,852,355 B2* | 2/2005 | Blanchet-Fincher | 427/58 |
| 7,229,726 B2* | 6/2007 | Caspar | 430/7 |
| 7,311,954 B2 | 12/2007 | Koops et al. | |
| 7,371,443 B2 | 5/2008 | Koops et al. | |
| 7,939,164 B2* | 5/2011 | Koops et al. | 428/212 |
| 2002/0160296 A1* | 10/2002 | Wolk et al. | 430/200 |
| 2003/0104309 A1* | 6/2003 | Koops et al. | 430/201 |
| 2003/0180638 A1* | 9/2003 | Tyan | 430/22 |
| 2005/0221027 A1* | 10/2005 | Koops et al. | 428/32.64 |
| 2006/0051604 A1 | 3/2006 | Koops et al. | |
| 2008/0290296 A1* | 11/2008 | Tahon et al. | 250/484.4 |
| 2009/0181188 A1 | 7/2009 | Koops et al. | |
| 2009/0181231 A1 | 7/2009 | Koops et al. | |
| 2010/0126975 A1 | 5/2010 | Koops et al. | |

FOREIGN PATENT DOCUMENTS

| | | |
|---|---|---|
| DE | 101 52 073 A1 | 5/2003 |
| DE | 102 13 110 A | 10/2003 |
| DE | 102 13 110 A1 | 10/2003 |
| DE | 102 13 111 A | 10/2003 |
| DE | 102 13111 A1 | 10/2003 |
| DE | 10 2007 046 176 A1 | 4/2009 |
| DE | 10 2008 025 582 A1 | 7/2009 |
| DE | 10 2008 025 583 A1 | 7/2009 |
| DE | 10 2008 058 535 A1 | 5/2010 |
| EP | 2078614 A1 | 7/2009 |
| WO | 03/035411 A2 | 5/2003 |
| WO | 03/080334 A1 | 10/2003 |
| WO | 03/080335 A1 | 10/2003 |

OTHER PUBLICATIONS

Family Search for WO 03/035411—published on May 1, 2003.*
European Search Report dated Apr. 14, 2011.
Non-English German Search Report dated Jul. 1, 2010.

* cited by examiner

METHOD OF APPLYING A DURABLE PROCESS MARK TO A PRODUCT, MORE PARTICULARLY GLASS

BACKGROUND OF THE INVENTION (1) Field of the Invention

The invention relates to a method of applying a durable process mark to a product, more particularly glass.

A process mark in the sense of the invention means a marking which is applied to a product, and the process mark on the product is read out in a further method by means of sensors, more particularly optical sensors, and the product is then aligned precisely into a predetermined position on the basis of the information obtained from the process mark.

The application of these kinds of process marks is vital to virtually all production sequences. In the case of automation, the marks applied to the product help to ensure, for optical sensors, continuous procedural monitoring and control in the production operations.

For a variety of reasons, these process marks are difficult to apply in a defined position. Remedies to date have often involved notches, projections, grooves and, for example, printed markings, which are then scanned mechanically or optically and used for orientation.

The marks are frequently applied by methods based on the copying of a single repeat. Such methods include rotational and intermittent marking operations, with the consequence that the marks are at an equal distance from one another.

(2) Description of Related Art

Process marks are used for monitoring and control, for the purpose, for example, of the automatic positioning of printing plates. In order to apply the individual colours in a positionally accurate way relative to one another in multi-colour printing, each printing plate prints an accompanying mark onto the print substrate. The positions of the process marks with the individual colours, also called register marks, are detected and compared with one another. This provides information on the positioning of the printing plate relative to the substrate, and is used as a basis for the precise orientation of the printing plates.

Process marks are frequently used to allow workpieces to be joined in a particular orientation. For this purpose, computer-assisted detection and orientation systems are used, in which the method is applied repeatedly to the continually recorded camera images of the process marks, also known as adjustment marks or positioning marks, until the positioning of the workpieces is correct.

A disadvantage of the known process marks is that they are usually produced in an intermittent operation, as for example in a printing process, and hence that only identical content can be applied. For example, at regular intervals on a continuous web, control marks are applied in the form of a rectangle. These control marks are recognized by a detection system and hence trigger a variety of operations—for example, the web is folded or slit.

In the assembly of appliances, moreover, process marks are used to provide the individual components with the correct orientation relative to one another. There again, an optical device captures the control mark. The device records deviations between the current position of the article and its desired position, and so the article is guided accordingly. The process mark thus contains only information concerning a position. Possible further information in the control mark, such as tolerances and quality of the components, that could be taken into account in downstream operations, is unknown.

The process marks ought typically to consist of a suitable material to rule out
- unwanted parting of the applied mark from the article;
- the scribing running, being wiped, or becoming illegible due to abrasion or lightening, and/or
- the functionality of the article being compromised.

BRIEF SUMMARY OF THE INVENTION

It is an object of the present invention to specify a method of applying a durable process mark to a product, more particularly glass, that allows rapid and precise—and, in particular, individual—scribing. Moreover, the scribing should be mild for the component, should not be capable of non-destructive detachment, and nevertheless should have high contrast, high resolution and high temperature resistance. A further intention is that it should be possible for the process mark to contain individual information as well, and to be used not just as a positional mark.

This object, the application of a durable process mark to a product, more particularly glass, is achieved by means of a method as specified in the main claim. Advantageous embodiments and developments are subject matter of the respective dependent claims.

The invention accordingly provides a method in which a laser applies the process mark to the product.

This is done, for example, by direct laser scribing of the product with the process mark. Powerful, controllable lasers for burning marks such as alphanumeric identifications, codes and the like are widespread. Properties of the material to be scribed or to be used for scribing, and also of the scribing method, advantageously include the following:

The material is rapidly scribable.
A high spatial resolution capacity is attained.
Material and scribing method are extremely simple to use.
Any decomposition products formed in the course of scribing are non-corrosive.
The scribing method has little or no effect on the mechanical stability of the component.

The upper layers of the product, which are removed, have the same composition as the material beneath them, and so the resulting process mark has the same temperature stability as the product. Moreover, the resistance to external influences such as weathering, water and/or solvents is also identical.

A problem is the contrast.

In order to optimize this, the layer on the product that is lased away in forming the process mark may have a different colour from the layer that appears beneath it.

Indicia are then produced that are of such contrast that they can be read without error even under adverse conditions, as for example over relatively large distances.

With glass surfaces, the method described can be used, but may have disadvantages. For instance, the resulting mark possesses low contrast (in the case of single-coloured glass) and is produced by erosion of glass material, which particularly in the case of thin-walled glass containers entails an alteration in mechanical stability.

Problems concerning the mechanical strength and stability of the marked component may also arise.

The removal of the top layers for the purpose of producing the process mark alters the thickness of material and also the mechanical properties of the product. The laser energy introduced causes microstructure changes in the material which in relation to external influences may initiate damage to the product. This applies particularly to very thin-walled products.

In order to remedy this situation, a process mark is formed not by removing material from the product, by engraving, but instead by applying an additional layer, as set out in detail below. This avoids the laser marking taking place with a change in the material of the product.

According to another advantageous embodiment of the method, the laser is used to lase a laser transfer sheet having an at least partially present pigment layer, which more particularly is present on the product, the pigment layer comprising at least one laser-sensitive pigment.

A pigment layer of this kind is known from DE 101 52 073 A. Material in the pigment layer is vaporized in the course of lasing. This method is referred to as the LTF (laser transfer film) or PLD (pulsed laser deposition) method. With both methods there is deposition of the vaporized material on the target substrate. The vaporized material enters into a physicochemical bond with the target substrate.

The laser transfer film has a carrier layer, with an adhesive layer being at least partially present on its bottom face. Furthermore, a pigment layer is applied at least partially on the carrier layer and/or the adhesive layer, and comprises a laser-sensitive pigment.

Examples of suitable pigments include colour pigments and metal salts. Use is made more particularly of pigments from Thermark, an example being Thermark 120-30F, which are metal oxides, molybdenum trioxide for example. It is possible, moreover, to use mixtures of two or more pigments or blends of pigments and glass particles, of the kind available from Merck and Ferro Inc., and these may lead to a sintering process. Suitability is further possessed by various pigments from Merck (examples being the pearlescent pigments EM 143220 and BR 3-01). In addition, the laser-sensitive pigment may also be used additionally to the additive titanium dioxide.

In order to produce the process mark with the laser, the laser transfer sheet is attached by its adhesive face to the product at the desired site. When using standard lasers, especially the widespread Nd-YAG solid state lasers with a wavelength of 1.06 μm, the laser beam passes through the carrier layer and the adhesive layer, and strikes the pigment. The energy is absorbed, and there is a process of sublimation, in which the pigment is transferred to the substrate and enters into a durable and stable bond with said substrate.

Crisp, high-contrast scribe marks and identity marks are obtained.

The films to be used must therefore be transparent and/or translucent, or at least must be such that they rule out absorption of the laser beam, which would lead to their destruction.

In particular it is desirable if the carrier material absorbs no light within the wavelength range from 530 to 1064 nm.

Transparency is understood to comprehend a transmittance of greater than 60%, more particularly a transmittance of greater than 90%, at a wavelength of 350 to 1150 nm.

The transmittance, or degree of transmission, which is generally specified in %, is the ratio of the light output that arrives at the reverse of a body through which light is transmitted to the light output that is incident on the front face. Transmission is curtailed by reflection and absorption.

The following is therefore the case: transmittance=(1−reflectance)×(1−absorbance).

As carrier material it is possible with preference to use monoaxially and biaxially oriented films based on polyolefins, then films based on oriented polyethylene or oriented copolymers comprising ethylene units and/or propylene units, and possibly also PVC films, films based on vinyl polymers, polyamides, polyester, polyacetals and polycarbonates. PET films more particularly are outstandingly suitable carriers.

According to another advantageous embodiment of the method, the laser is used to lase a laser transfer sheet which is present preferably on the product and has at least one carrier layer, there being at least partially present on the bottom face of the carrier layer a first adhesive layer, and there being present on that face of the laser transfer sheet carrier layer that bears the first adhesive layer at least two pigment layers: preferably one, at least partially applied first pigment layer, which comprises at least one glass flux pigment, and one, at least partially applied second pigment layer, which comprises at least one laser-sensitive pigment. Preferably the first pigment layer comprises a glass flux pigment and an absorber and/or the second pigment layer comprises a glass flux pigment, an absorber and a laser-sensitive pigment.

The structure of the layers comprising the pigments is preferably likewise composed of the adhesive of the first adhesive layer, and so the first adhesive layer and the pigment layers form a single, homogeneous layer. Only in the marginal region of the homogeneous layer, specifically on the side remote from the carrier layer, are the pigments distributed in a different composition within a region of the homogeneous layer that is, in particular, comparatively narrow. Accordingly, two or more boundary layers are formed.

According to another advantageous embodiment of the method, the laser is used to lase a laser transfer sheet which is present preferably on the product and has at least one carrier layer, similar to the one above, specifically with a first adhesive layer at least partially present on the bottom face of the carrier layer and with, on that side of the laser transfer sheet carrier layer that bears the first adhesive layer, at least two pigment layers comprising a laser-sensitive pigment being at least partially present, and the concentrations of the laser-sensitive pigment in the pigment layers being different. These are preferably two pigment layers where, in particular, the concentration of the laser-sensitive pigment in the first pigment layer, nearer the carrier layer, is lower than the concentration of the laser-sensitive pigment in the second pigment layer.

With further preference these are three pigment layers, the concentration of the laser-sensitive pigment in the first pigment layer, closer to the carrier layer, being lower than the concentration of the laser-sensitive pigment in the second pigment layer, that concentration being lower in turn than the concentration of the laser-sensitive pigment in the outer pigment layer.

In one particularly outstanding embodiment, the concentration of the laser-sensitive pigment in the first pigment layer, adjacent to the carrier layer, is between 0.25% to 0.75% by weight, more particularly 0.5% by weight, the concentration of the laser-sensitive pigment in the second pigment layer is between 0.75% to 1.25% by weight, more particularly 1% by weight, and the concentration of the laser-sensitive pigment in a third pigment layer—when present—is between 1.5% to 2.5% by weight, more particularly 2% by weight.

With further preference, the pigment layers comprise a glass flux pigment and an absorber in addition to the laser-sensitive pigments.

As glass flux pigment and absorber it is preferred to use silicon dioxide or mixtures such as BaO—CaO—$SiO_2$.

Glass flux pigments comprise ground glass admixed beforehand in the melt with flux agents (a term for adjuvants added to facilitate melting). The flux agents may be metal oxides which aim to lower the melting temperature with as small as possible an increase in the thermal expansion.

The following particle size distribution of the glass flux pigments is advisable for a laser transfer sheet of the invention:

| Type | Description | Average particle size [μm] |
|---|---|---|
| SM | Narrow distribution | 2.5-3.5 |
| UF | Dental powder, including silanised | 0.7-1.5 |

The following distributions, though possible, are not used with preference:

| Type | Description | Average particle size [μm] |
|---|---|---|
| K | Standard | 3.0-30.0 |
| FK | High powder purity | 1.0-3.5 |
| VT | Broad distribution | 4.0-10.0 |

When using the standard lasers, especially the widespread Nd-YAG solid state lasers with a wavelength of 1.06 μm, the laser beam passes through the carrier layer and the adhesive layer and, within the pigment layer(s), strikes the laser-sensitive pigment and also any glass flux pigment and absorber adjuvants that may be present.

A sintering process occurs, in which the laser-sensitive pigment is transferred to the substrate, with which it enters into a durable, stable bond.

Crisp, high-contrast scribe marks and identity marks are obtained.

If glass flux pigments are provided, the metal oxide formed as a result of the sintering process is coated at the same time with a layer of glass.

Laser transfer sheets of these kinds are described in DE 102 13 110 A1 and in DE 102 13 111 A1. The stated laser transfer sheets can be employed with particular advantage on glass.

The laser transfer sheet may be provided in the form of a continuous roll, wound up in the form of an Archimedean spiral around—usually—a cardboard core, or in the form of a diecut label. The latter may have any desired design, outstandingly adapted to the particular end use.

With particular advantage the process mark can be produced with a pigment layer which is based on a polymer matrix. As well as the polymer matrix, the pigment layer comprises a titanium donor as a further constituent. A titanium donor in this context is pure titanium or a titanium compound which has an affinity to provide free titanium as a reactant, at any rate in the short term, under exposure to energy. If appropriate, the provision of the free titanium may also take place via the route of a titanium-containing intermediate. Further provided is a carbon donor, in other words a material which, under energy irradiation, provides free carbon—that is, carbon which is not attached chemically. This may be an additional carbon compound to the polymer matrix; where appropriate, however, the polymer matrix itself may also be sufficient as a source of free carbon.

It is essential that the polymer matrix reacts with pulverization when irradiated with high-energy laser radiation. During the pulverization, free carbon is formed and the titanium compound is cleaved. The marking deposited in this process is a new titanium compound, more particularly titanium carbide, on the substrate to be marked. With a sufficiently high concentration of free carbon, this as well is incorporated in the new titanium compound, thus allowing the contrast of the mark to be influenced in a specific way.

This laser-induced pulverization is achieved preferably in the case of brittle materials. When the power is sufficiently high, a vapour capillary is formed in conjunction with a plasma. Through the capillary, the absorption takes on substantially higher values, and so the laser radiation is able to penetrate more deeply into the material and can explosively remove the plastic material in particle form from the matrix around the zone of thermal influence. This effect can be utilized optimally for the production of the transfer material, with this capillary serving as a reactant space, and the resulting powder is reacted as titanium donor and carbon donor for the synthesis of titanium carbide.

A polymer matrix in the present case is the term for any matrix based on polymeric constituents. Besides the polymer constituents, the matrix may also comprise any desired non-polymeric constituents; only the main constituent should be polymeric in nature. More particularly the term "polymer matrix" also refers to a mixture of base polymers. In a particularly preferred embodiment the polymer matrix is a thermoset polymer matrix. It has emerged that thermosets in particular are especially suitable for obtaining pulverization.

The pigment layer is formed free from plastics which melt under energy irradiation, and in particular is also formed free from other melting materials. By this means it is possible on the one hand to keep the structure of the product extremely simple, and on the other hand scribing is not adversely affected by the melting of plastic or other materials. Furthermore, in the case of the present pigment layer, it is also possible to do without a glass frit constituent. Surprisingly it has emerged that a durable bond of the mark to glass in particular is achieved even without a glass frit.

A glass frit is understood usually to be an intermediate in the production of glass melts. The glass frit is a porous glass crumb formed by the quenching of a raw materials mixture melted at high temperatures. The glass frit is used as a raw material for the production of enamels. Enamels are produced by the melting of the glass frit and added components, such as colour pigments or fillers, onto a glass or metal workpiece. Ceramic colours are therefore often referred to as enamels or glass enamels as well.

A glass frit is produced by the melting and subsequent quenching of a glass mass. The resultant glass frit is ground to particle sizes preferably <40 μm and is mixed where appropriate with the adjuvants (pigments, fillers). The powder is generally pasted with a suspension medium, an example being screen printing oil, and applied preferably by means of screen printing to the article that is to be decorated. This is followed by the baking operation, in which the glass frit softens and forms a glass flux on the carrier substrate surface, the adjuvants being embedded in this flux and being fixed on the carrier substrate. Sufficient adhesion of the ceramic colour must therefore take place below the deformation temperature of the carrier substrate.

Therefore, particularly for the decoration, for example, of borosilicate glasses having transformation temperatures of around 530° C., it is necessary to use low-melting glass frits which can be fired at below 750° C.

All typical types of glass may be used as glass frits.

Preferably, the titanium compound is titanium dioxide, preferably in rutile structure. The rutile structure is one of the four crystal polymorphs of titanium dioxide, as is known from the technical literature. The titanium dioxide pigments in rutile structure have a refractive index, n, of 2.75 and absorb fractions of visible light even at wavelengths around 430 nm. They have a hardness (Mohs) of 6 to 7.

In a further-preferred embodiment the pigment layer contains carbon black or graphite for the provision of the free carbon that is needed for the synthesis of titanium carbide. The carbon black cleaves under energy irradiation, more particularly under laser irradiation, and, in so doing, forms free carbon. Furthermore, the free carbon may also originate from the polymer matrix decomposed, evaporated, oxidized, depolymerized and/or pyrolysed on exposure to energy, more particularly by laser irradiation.

Preference is given to using neutral carbon black with a pH of 6 to 8. This is preferred more particularly in respect of ease of handling and for the avoidance of special safety precautions involved with acidic or basic materials. Preferred suitability is possessed predominantly by thermal black, acetylene black and lamp black. Lamp black is particularly preferred. The pH of lamp black is typically 7 to 8, that of thermal black 7 to 9, and that of acetylene black 5 to 8. The pH of furnace blacks is situated typically at 9 to 11, and they are therefore very basic. Oxidized gas blacks have a pH situated typically at 2.5 to 6, and are therefore acidic. The use of such acidic or basic carbon blacks, however, is not ruled out in principle.

The stated pigment blacks are extremely resistant to chemicals and are distinguished by high light fastness and weathering resistance. On account of the very high depth of colour and colour strength, and also of other specific properties, pigment blacks are the most frequently used black pigments. Pigment blacks are manufactured industrially by thermooxidative or thermal cleavage of hydrocarbons. Pigment blacks are produced almost exclusively by the furnace black process, Degussa gas black process or lamp black process, these processes being known from the literature.

According to another advantageous embodiment of the invention the polymer matrix is a radiation-cured polymer matrix. The polymer matrix is composed advantageously of a varnish, more particularly of a cured varnish, preferably a radiation-cured varnish, with particular preference an electron beam-cured aliphatic, difunctional polyurethane acrylate varnish. In one alternative embodiment the polymer matrix is composed of polyester acrylate. This cured varnish has a very high hardness and a high level of brittleness.

In principle there are four types of varnish which can be used advantageously for the polymer matrix, provided that their stability is sufficient: for example, acid-curing alkyd-melamine resins, addition-crosslinking polyurethanes, free-radically curing styrene varnishes and the like. Particular advantage, however, is possessed by radiation-curing varnishes, on account of their very rapid curing without lengthy evaporation of solvents or exposure to heat. Varnishes of this kind have been described, for example, by A. Vrancken (Farbe and Lack 83, 3 (1977) 171).

According to one particularly advantageous embodiment of the invention the composition of the pigment layer is as follows:

| 100 phr | polymer matrix, more particularly a radiation-cured aliphatic, difunctional polyurethane acrylate, |
| 0.2 phr to 2.5 phr | carbon black and |
| 45 phr to 65 phr | titanium dioxide. |

"phr" here denotes "parts per hundred resin", a unit commonplace in the polymer industry for the purpose of characterizing compositions of mixtures, with all of the polymeric ingredients (in this case, therefore, the polymer matrix) being set at 100 phr.

With further preference the composition is as follows:

| 100 phr | polymer matrix, more particularly a radiation-cured aliphatic, difunctional polyurethane acrylate, |
| 0.4 phr | carbon black and |
| 63.2 phr | titanium dioxide. |

The thickness of the pigment layer is situated advantageously in a range from about 20 µm to about 500 µm, more particularly in a range from about 30 µm to about 100 µm, in order to meet with outstanding effect the requirements imposed on it.

The properties can be optimized by blending the pigment layer with one or more additives such as plasticizers, fillers, pigments, UV absorbers, light stabilizers, ageing inhibitors, crosslinking agents, crosslinking promoters or elastomers.

When the high-energy laser beam strikes the pigment layer, said layer is disintegrated essentially into small particles in the region of the point of strike, and so the pulverized material removed from the pigment layer by laser-generated burning has a number-average particle size of 0.5 µm to 2.0 µm.

On irradiation of laser radiation, in the form for example of a laser pulse, the radiation or laser light comes directly into contact or interaction with the surface of the pigment layer, and leads to pulverization of the polymer matrix. In the case of a laser beam, the beam is coupled into the material by absorption. The absorption has the effect that material is vaporized, that particles are extracted from the pigment layer, and that a plasma may be formed. Particularly at the margins of the laser beam exposure there are thermal melting processes occurring.

Typically, when the irradiated energy is converted into heat, long-chain polymer constituents of the pigment layer are cleaved, and the products of thermal cracking include elemental carbon. In summary, the polymer matrix undergoes particulation/evaporation/decomposition as a result of the high energy input.

This carbon is deposited in particular in the form of titanium carbide on the product to be scribed. The emission constituents at the time of scribing are therefore the elemental carbon, the $TiO_2$ and the cracking products from the polymer matrix of the pigment layer. The following reaction may reflect the process, which can be described as a carbothermal synthesis reaction for the preparation of titanium carbide.

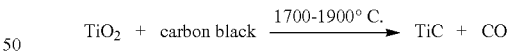

The energy input is determined by the interaction coefficient of the reactants, in particular their absorption characteristics, and also by the nature of the radiation and the parameterization of the radiation source. Following selection of the suitable radiation source, more particularly a laser, control is implemented primarily via the radiation output and the scribing speed.

Titanium carbide (also identified as TiC) is a member of the non-oxide ceramics. Non-oxide ceramics are distinguished by relatively high covalent and low ionic bonding components, with high chemical and thermal stability as compared with the silicate ceramics and oxide ceramics. Industrial titanium carbide contains around 19.5% by mass of bonded carbon and up to 0.5% by mass of unbonded carbon, referred to as free carbon. The theoretical stoichiometric carbon content is 20.05% by mass.

The properties of titanium carbide compound (TiC) (see FIG. 4) are as follows:
Colour: grey metallic
Melting point: 3157° C.
Density: 4.93 g/cm$^3$
Crystal structure: cubic, possessing closest sphere packing, when all of the octahedral gaps are filled: TiC The following properties/advantages in particular are associated with titanium carbide:
- a relatively high hardness and hence resistance to abrasion and wear
- a very high heat resistance
- corrosion stability
- good biocompatibility
- ferroelectric properties
- low thermal conductivity (when the carbon fraction is high)
- electrical semiconduction
- resistance to cold acids and alkalis As a result of the formation of inclusion compounds or interstitial compounds (occupying lattice interstices), it is possible for small carbon atoms to be intercalated at lattice interstices or spaces in the crystal lattice, these atoms then giving the titanium carbide a black colour. This results, ultimately, in a high-contrast black scribe marking on the substrate that is to be scribed.

In other words, the very high-contrast scribe marking on the substrate to be scribed comes about as a result of the fact that titanium carbide is deposited on the substrate, the spaces in the crystal lattice being penetrated by free carbon atoms which originate, for example, from the carbon black or from the cracked elemental carbon from the polymer matrix.

According to a further advantageous embodiment of the invention, the pigment layer is coated partially or over its whole area with an adhesive, more particularly a pressure-sensitive adhesive. An embodiment of this kind is particularly advantageous for allowing ease of use of the pigment layer. By means of the (partial) adhesive layer formed in this way, the pigment layer can be fixed simply, during the scribing process, on the substrate that is to be marked, without a risk of displacement of the pigment layer.

In particular the adhesive layer may be applied in the form of dots or by screen printing, where appropriate also in the form of marginal printing, and so the pigment layer can be bonded to the substrate in any desired way.

The adhesive in question is preferably a pressure-sensitive adhesive (PSA). The pigment layer is coated on one or both sides with the preferred PSA in the form of a solution or dispersion or in 100% form (for example from the melt). The adhesive layer or layers can be crosslinked by means of heat or high-energy radiation and, where necessary, can be lined with release film or release paper. Suitable PSAs are described in D. Satas, Handbook of Pressure Sensitive Adhesive Technology (Van Nostrand Reinhold). Suitability is possessed in particular by PSAs based on acrylate, natural rubber, thermoplastic styrene block copolymer or silicone.

For the optimization of the properties it is possible for the self-adhesive composition employed to be blended with one or more additives such as tackifiers (resins), plasticizers, fillers, pigments, UV absorbers, light stabilizers, ageing inhibitors, cross-linking agents, crosslinking promoters or elastomers. The formulation of the adhesive is guided in particular by the intended use, in other words by the nature of the bonding substrate, the prospective period of bonding, the ambient conditions, etc.

Suitable elastomers for blending are, for example, EPDM rubber or EPM rubber, polyisobutylene, butyl rubber, ethylene-vinyl acetate, hydrogenated block copolymers of dienes (for example, through hydrogenation of SBR, cSBR, BAN, NBR, SBS, SIS or IR; such polymers are known, for example, as SEPS and SEBS) or acrylate copolymers such as ACM.

Suitable tackifiers are, for example, hydrocarbon resins (formed for example from unsaturated C$_5$ or C$_7$ monomers), terpene-phenolic resins, terpene resins from raw materials such as α- or β-pinene, aromatic resins such as coumarone-indene resins, or resins formed from styrene or α-methylstyrene, such as rosin and its derivatives, such as disproportionated, dimerized or esterified resins, the use of glycols, glycerol or pentaerythritol being possible, and also others, as listed in Ullmanns Enzyklopädie der technischen Chemie, volume 12, pages 525 to 555 (4th edition), Weinheim. Particularly suitable resins are those which are stable to ageing and have no olefinic double bond, such as hydrogenated resins, for example.

Examples of suitable plasticizers are aliphatic, cycloaliphatic and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizer resins based on the raw materials for tackifier resins, wool wax and other waxes, or liquid silicones.

Examples of suitable crosslinking agents are phenolic resins or halogenated phenolic resins, melamine resins and formaldehyde resins. Suitable crosslinking promoters are, for example, maleimides, allyl esters such as Wallyl cyanurate, and polyfunctional esters of acrylic and methacrylic acid.

The coating thickness with adhesive is preferably in the range from about 5 g/m$^2$ to about 100 g/m$^2$, more particularly from about 10 g/m$^2$ to about 25 g/m$^2$.

With further preference the pigment layer is applied on a carrier, preferably on a carrier sheet. Application is accomplished advantageously by coating the pigment layer onto the carrier.

As the carrier sheet it is possible with preference to use films which are transparent, more particularly monoaxially and biaxially oriented films based on polyolefins, films based on oriented polyethylene or oriented copolymers comprising ethylene units and/or polypropylene units, and also, where appropriate, PVC films and/or films based on vinyl polymers, polyamides, polyester, polyacetals or polycarbonates. PET films as well are outstandingly suitable as carriers. Films based on oriented polyethylene or oriented copolymers containing ethylene units and/or polypropylene units as well are suitable as a carrier sheet.

Preference extends to single-layer biaxially or monoaxially oriented films and multi-layer biaxial or monoaxial films based on polypropylene. Films based on unplasticized PVC can be used, as can films based on plasticized PVC. Polyester-based films, such as poly-ethylene terephthalate, for example, are likewise known and are suitable as carriers of the pigment layer.

It is also possible for parts of the pigment layer to have been deactivated by means of a partially applied passivating layer, specifically on the side which in the course of the marking operation is in contact with the substrate. By this means it is possible to prevent marking of the substrate in certain regions even from the outset. Passivation may take place, for example, in the form of a negative of the desired marking, so that the marking itself can take place subsequently by means of areal irradiation.

The pigment layer with or without carrier sheet and/or adhesive coating and with all further layers may for the purposes of this invention be present in the form of all sheetlike structures, such as two-dimensionally extended films or film sections, tapes with extended length and limited width, tape sections, diecuts, labels and the like, for example. Also possible is the winding of a comparatively long pigment layer to form an Archimedean spiral, from which a section of desired length is separated off for use in each case.

With the pigment layer it is possible to obtain scribed marks having a resolution in the order of magnitude. With further preference the applied marking is an interference hologram, since the resolution quality of the method permits structures for light intensification and light extinction. Alternatively the scribed mark may also be made in the form of a computer-generated hologram. Through calculation of the hologram structure and application of this structure by laser irradiation, a computer-generated hologram allows the identity marking to be individualized, and this identity marking, on account of its format, is difficult to forge and hence affords a high level of anti-counterfeit protection. Moreover, it is easy for information to be introduced in hidden form into a structure of this kind.

Especially when the standard lasers are employed, more especially the widespread Nd-YAG solid-state lasers with a wavelength of 1.06 µm, the scribe markings and identity markings obtained are crisp and of high contrast.

With further preference the pigment layer can be used in a method of marking a substrate, more particularly glass, the pigment layer being brought by pressing into direct contact with the substrate to be scribed, and the pigment layer being subsequently irradiated with high-energy laser radiation. As a result of the irradiation, the polymer matrix is pulverized, free carbon is formed, and a marking is formed on the substrate in the irradiated regions. In particular, the scribing of glass by means of the above-described pigment layer has proved to be particularly advantageous. Scribing can be done with relatively short exposure times and the scribed mark is joined permanently to the glass. Moreover, the scribing can also be carried out without visible damage to the glass.

The direct contact between pigment layer and substrate avoids an interspace which leads to an enlargement of the reaction space during laser irradiation. The consequence of this would be to allow the deposit on the substrate to be distributed over a larger surface area, so lessening the contour definition of the resulting scribed marking.

This method is suitable more particularly for marking transparent substrates, such as glass, for example, since scribing can take place through the substrate. The radiation therefore penetrates the substrate, or else, possibly, two or more layers of the substrate in the case of a corresponding structure such as a tube, and interacts with the pigment layer disposed on the substrate, as a result of which, as described above, the marking is formed on the side of the substrate remote from the radiation source.

Particularly in the case of the scribed marking of glass, all of the advantages of the pigment layer of the invention are utilized: marking takes place in an extremely resistant way. A very good scribing outcome is obtained. Moreover, the level of fume generated is surprisingly low. Immediately after the scribing process, the indicia exhibit a very high contrast. The unfixed residue can be removed by dry or wet wiping of the identity marking surface.

Application of the pigment layer is preferably preceded by cleaning of the surface to be scribed. In addition it is advantageous if, after the high-energy laser radiation has been applied, and hence the mark, the substrate surface is cleaned to remove residues and/or the pigment layer that is not needed any longer is removed. It is particularly advantageous in this context if the pigment layer is applied substantially only to regions of the surface that are subsequently to be scribed or marked.

Preference is given to using a diode-pumped solid-state laser, the pulse duration of the laser being between 40 and 90 ns, the initial output being 20 watts and/or the scribing rate being 250 mm/sec to 750 mm/sec, depending on the content of the scribed marking.

With a view to the ongoing laser technology, however, even shorter pulse lengths are conceivable, in particular down to pulse durations in the ps or fs range. A pulse duration of this shortness is particularly advantageous in respect in particular of short exposure cycles.

Where the target substrate is glass, the transmission technique is possible, since the wavelength of 1.064 µm that is used is transparent for glass.

The scribed marking which comes about on the glass has a height of 0.25 µm to 3.0 µm, depending on the content of the scribed marking and on the parameterization. The temperature stability has been shown to be in the range from −50° C. to 1200° C. The low-temperature resistance and heat resistance, however, are significantly higher. The mechanical resistance with respect to abrasion is extremely high (crockmeter test (to DIN EN 1096-2)>1000 strokes).

The scribed marking exhibits a high accuracy of resolution; depending on the beam quality used, the line width is 70 µm to 80 µm. It is possible for example to produce machine-readable 2D codes with an edge length of 1.5 mm×1.5 mm and a content of 16 characters. Moreover, it is possible to realize all of the typical content of identity markings, such as logos, pictograms, drawings, alphanumeric symbols, special symbols, and pixel graphics.

As a result of the high-precision representation of structural content via the laser method, the process mark can be applied as a diffractive control mark in the form of surface structures, as a computer-generated hologram or interference hologram, in the form of deflection structures, in the form of diffraction structures, in the form of kinegrams and/or the like, and can be read out as an optically active layer using special reading devices. Moreover, these marks may also serve as a security element.

Through the laser operation it is possible to apply control marks in an extremely precise manner, with a tolerance of +/−0.1 µm, and with a height of 0.1 to 5 µm.

Since the control mark is present in the form of an optically active layer, it is invisible under normal viewing conditions. Accordingly, a component can be provided inconspicuously with a process mark that can be recognised and read out under specific lighting conditions.

The component, therefore, contains no design-disrupting marks.

This advantage is comparable with that of fluorescent marks employed as a control mark on cartons in pharmacy.

Where, however, positioning marks and adjustment marks are used in very small format, with the result that the optical detection systems detect them only poorly and not quickly enough, the method of the invention can be used to set search marks. These may be a larger element or else a search grid with the positioning and adjustment mark located at the centrepoint of the grid.

Search marks in this context are used for rapid, automated finding of the positioning marks, in order to obtain a significant reduction in search times for mark location finding and to perform a rapid, automated alignment process.

The invention also embraces, finally, a glass article marked using the method of the invention. The term "glass article"

encompasses all articles made of glass, especially sheets, containers or tubes, and glass surfaces of generally convex or concave curvature.

The method of the invention affords a large number of advantages.

Through the use of a laser, the process marks can be produced flexibly in terms of their position, with high precision, and with additional data content specific to the particular component—that is, as well as the positional feature, the process mark contains a component-specific data set for individual information on further processing.

The process mark can be applied invisibly to the substrate, and could then be read out by means of special lighting.

In this way the optically active layers act as a security element.

In the text below, an example is used to illustrate the composition of a polymer layer in more detail, without any restrictive effect whatsoever:

| Substrate | Fraction [phr] |
|---|---|
| EB 284 | 85.1 |
| HDDA | 5.0 |
| DVE 3 | 9.9 |
| Carbon black | 0.4 |
| Titanium dioxide | 63.2 |
| Sum total | 163.6 |

EB 284: Aliphatic, difunctional polyurethane acrylate (manufacturer: Cytec)
HDDA: Hexanediol diacrylate (manufacturer: BASF)
DVE 3: Divinyl ether (manufacturer: ISP or BASF)
Carbon black: Furnace black with a particle size of 56 nm, surface area 45 m$^2$/g (manufacturer: Evonik, Printex 25)
TiO$_2$: (Manufacturer: Kronos, Kronos 2160)

The composition is coated out to give a layer having a thickness of 100 μm. Sections measuring 30×50 mm are produced from the applied coat by punching.

The polymer layer may be used to produce a process mark: for example, prior to their assembly, individual functional parts are frequently provided with calibrating marks or process marks in the form of adjustment marks, including medical devices, since appropriate calibrations to particular components or assemblies of these devices are necessary in the course of their production.

For instance, the manometer unit of a blood pressure measuring instrument may be calibrated by individually marking the glass cover component with a calibrated scale in the course of assembly. Moreover, an adjustment mark is applied for the glass, to enable centered assembly with the manometer housing. This adjustment mark may therefore contain a data set for location finding, if different manometer housings are employed.

The method can additionally be used, for example, for the solar industry in a useful way. Here, a process mark is applied for the alignment of a flat solar cover plate for thin-film modules through all process stages. In order to allow determination of the position of the process mark with maximum precision, the process marks may be applied to the substrate in the form of a 1D or 2D code.

In addition to the calibrating marks already mentioned, serving for scaling, as a calibration mark or for dimensioning, it is also possible for marks to be applied for focusing (pathfinder, target finder, sectional image indicator, prism grid, focusing aid) or detection (test field, array, cut-to-size marks) using the above-described laser transfer sheets or the polymer layer.

BRIEF DESCRIPTION OF THE SEVERAL VIEWS OF THE DRAWING(S)

Using several figures, the method of producing a process mark on a glass article, using a polymer layer in one advantageous embodiment, is illustrated in more detail, without any intention thereby to restrict the invention unnecessarily.

DETAILED DESCRIPTION OF THE INVENTION

Figure 1:
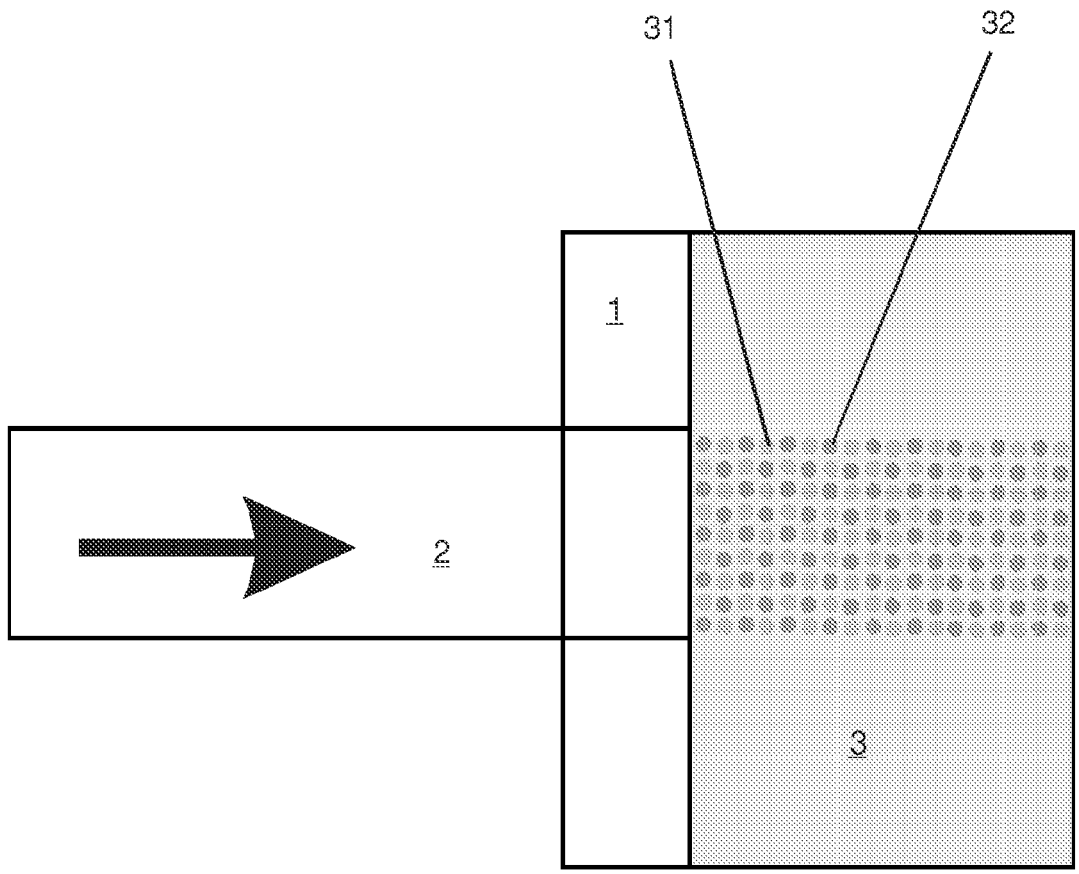
FIG. 1 shows the scribing of a glass article by means of a laser, by the transmission technique and using a pigment layer.

FIG. 1 shows the production of a process mark on a glass article 1 by means of a laser which emits a laser beam 2, using the transmission technique and the pigment layer 3.

The laser used is an Nd:YAG laser with a wavelength of 1.064 μm which is transparent for the glass article 1. The laser beam 2 therefore passes through the glass article 1 and strikes the pigment layer 3, which is in direct contact with the glass article 1. The pigment layer 3 is composed of a polymer matrix, with titanium dioxide 31 and carbon black 32 incorporated therein by mixing.

Figure 2:
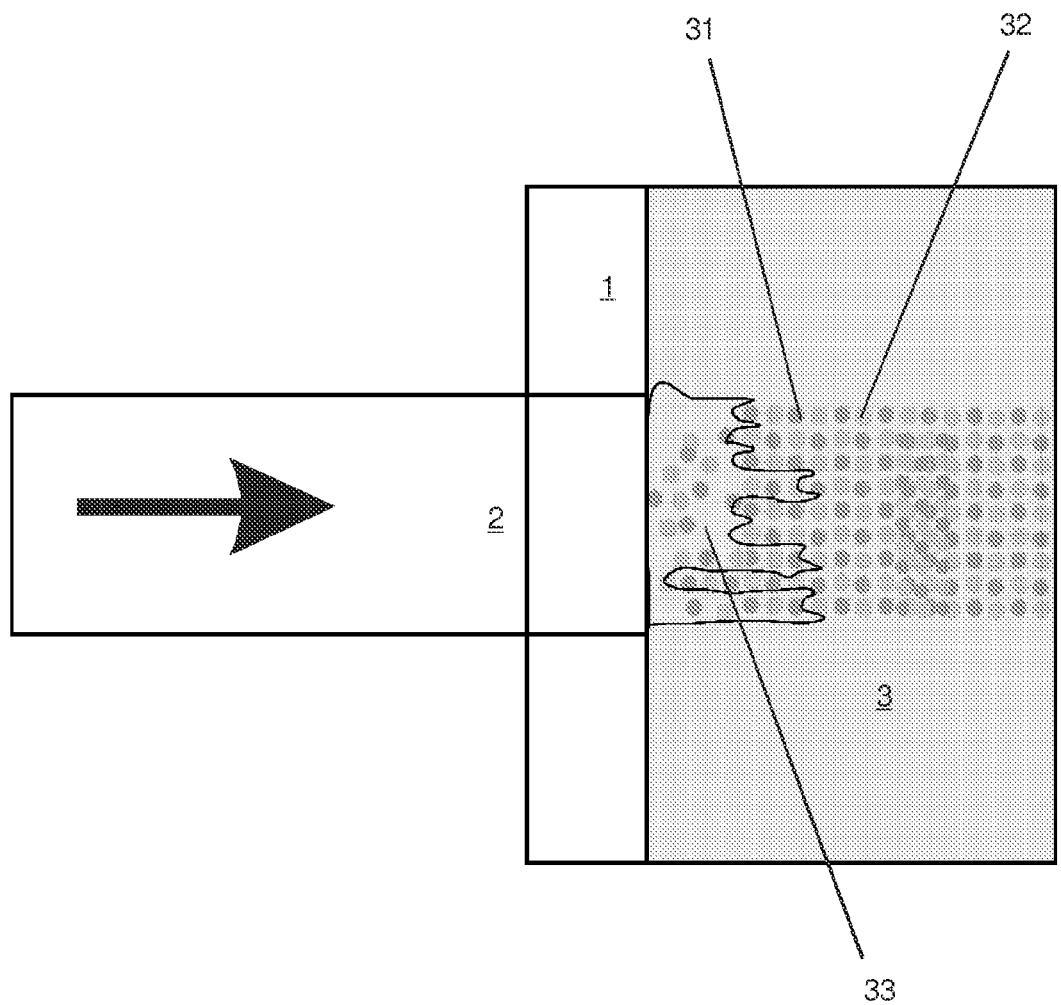
FIG. 2 shows the process of pulverization and subsequent vaporization of the polymer matrix of the pigment layer at the point where the laser strikes.

FIG. 2 shows the process of vaporization, with pulverization beforehand, of the polymer matrix of the pigment layer 3 at the point where the laser strikes. The striking of the laser light 2 on the pigment layer 3 converts the laser light 2 into heat, which acts on the surface of the pigment layer 3. The polymer matrix, as a result of absorption of the laser light 2, is converted locally into a plasma 33, also called a plasma cloud.

Figure 3:
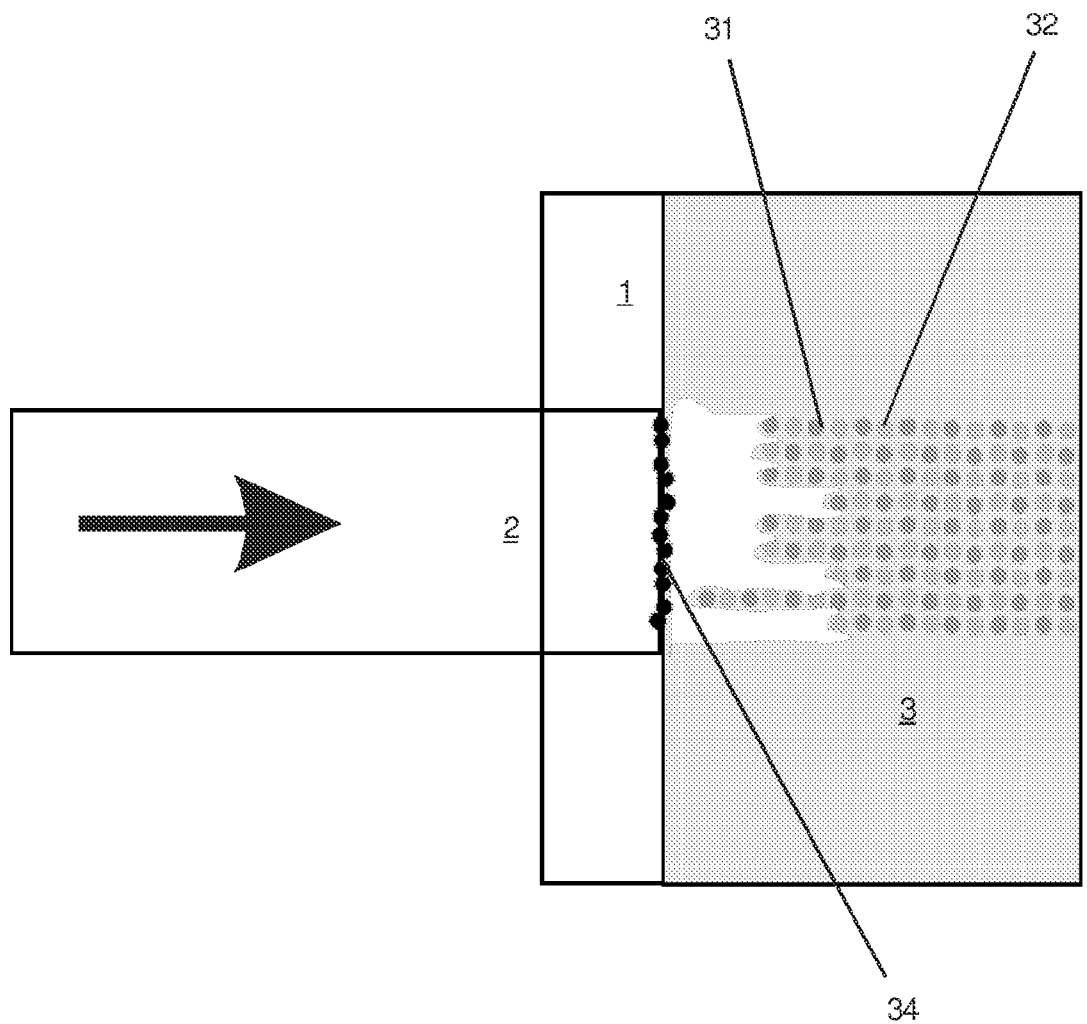
FIG. 3 shows the formation of the process mark on the glass article by titanium carbide.
Figure 4:
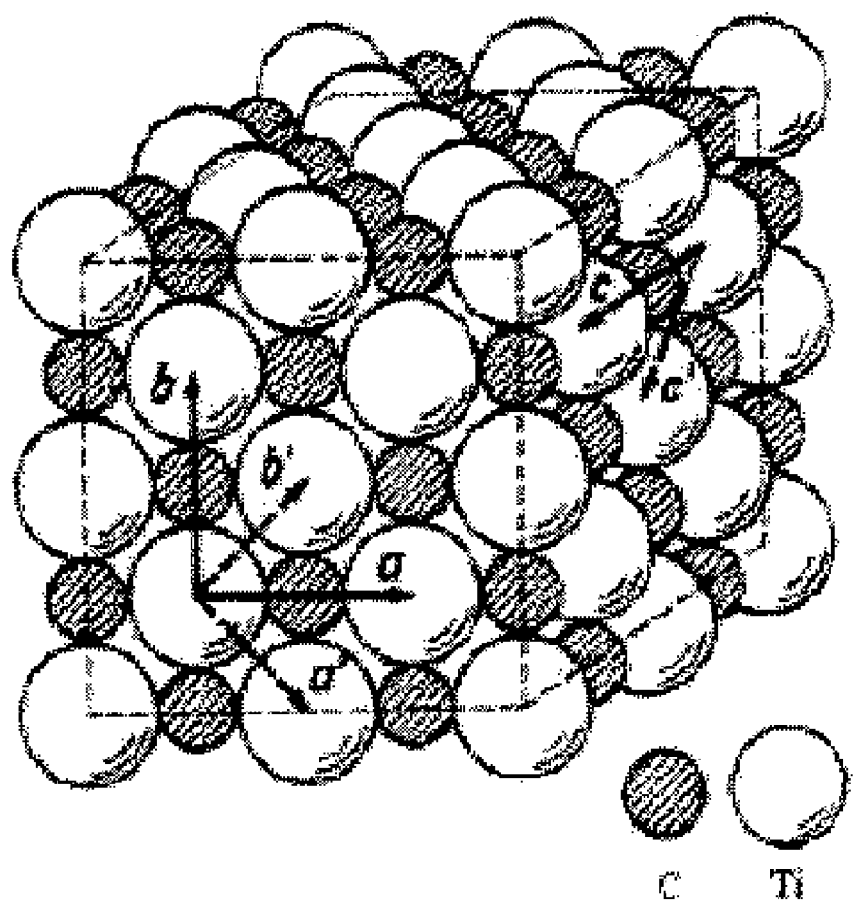
FIG. 4 shows a titanium carbide compound (TiC).

As a result of the formation of the plasma 33 a reaction takes place between the titanium dioxide 31 and the carbon black 32, to give titanium carbide 34, which, as shown in FIG. 3, is deposited on the surface of the glass article 1 and forms the desired process mark.

The invention claimed is:
1. A method of applying a durable process mark to a glass substrate with a laser, comprising the steps of
applying a transfer sheet to the glass substrate, the transfer sheet including at least one carrier layer with at least a first adhesive layer, adhered partially to a bottom side of the carrier layer,
providing on the face of the carrier layer at least a first and a second pigment layer,
lasing the transfer sheet with a laser providing irradiation sufficient to predominantly pulverize the at least first pigment layer,
wherein the first pigment layer is provided on a polymer matrix, which includes at least one titanium donor and a carbon donor, which upon laser irradiation reacts predominantly with pulverization, thereby forming a plasma and by providing free carbon.
2. The method of claim 1, comprising the steps of
partially applying the at least first and second pigment layers to the carrier layer, combining the first pigment layer with a glass flux pigment, and combining the second pigment layer with a laser-sensitive pigment.

3. The method according to claim 1, further comprising wherein the at least first and second pigment layer include a laser-sensitive pigment which differs in concentration.

4. The method according to claim 1, further comprising the step of coating the first pigment layer with a second adhesive.

5. The method according to claim 4, wherein the second adhesive is a pressure-sensitive adhesive.

6. The method according to claim 1, further comprising the step of forming the polymer matrix free from plastics and/or glass frit.

7. The method according to claim 1, wherein the titanium donor is titanium dioxide.

8. The method according to claim 1, wherein the carbon donor is carbon black or the polymer matrix.

9. The method according to claim 1, further comprising the step of removing the pulverized pigment layer having a number-average particle size of about 0.5 µm to about 2.0 µm from the pigment layer by burning generated by energy irradiation.

10. The method according to claim 1, further comprising the step of deactivating the pigment layer as a result of a partially applied passivating layer, wherein the passivating layer is on the side of the pigment layer which, during the marking operation, is contacting the glass substrate.

11. The method according to claim 1, further comprising the step of bringing the pigment layer into direct contact with the substrate to be scribed by pressing the layer, irradiating the pigment layer with laser radiation, causing the pulverization of a polymer matrix and forming free carbon, and forming a process marking as a result of the irradiation on the substrate.

12. The method according to claim 1, further comprising the step of implementing the process mark with exclusion of a glass frit and/or with exclusion of a plastic.

13. The method according to claim 11, wherein the process marking is formed on the side of the substrate remote from the radiation source.

14. The method according to claim 13, wherein the process marking is applied as a diffractive control mark in form of surface structures, as a computer-generated hologram or interference hologram, in form of deflection structures, or in form of diffraction structures, or in form of kinegrams and is read out as an optically active layer with special read devices.

15. The method according to claim 13, further comprising the step of providing a positional feature.

16. The method according to claim 15, wherein the process marking is applied with a positioning accuracy of +/−0.1 µm and a height of 0.1 to 5 µm.

17. The method according to claim 15, wherein the positional feature is a component-specific data set for individual information on further processing to the process mark.

18. A method of applying a durable process mark to a glass substrate with a laser, comprising the steps of applying a transfer sheet to the glass substrate, the transfer sheet including at least one carrier layer having a bottom side and a face side, with at least a first adhesive layer adhered partially to the bottom side of the at least one carrier layer and providing on the face side of the at least one carrier layer at least a first and a second pigment layer, providing coating of the first pigment layer with a second adhesive, providing the first pigment layer on a polymer matrix, which includes at least one titanium donor and a carbon donor, wherein the second adhesive is a pressure sensitive adhesive, lasing the transfer sheet with a laser providing irradiation sufficient to predominantly pulverize the pigment layer, and thereby forming a plasma and by providing free carbon.

* * * * *

UNITED STATES PATENT AND TRADEMARK OFFICE
CERTIFICATE OF CORRECTION

PATENT NO. : 8,308,890 B2  
APPLICATION NO. : 12/781338  
DATED : November 13, 2012  
INVENTOR(S) : Koops et al.

Page 1 of 1

It is certified that error appears in the above-identified patent and that said Letters Patent is hereby corrected as shown below:

In the Specification

Column 10, line 29, "Wallyl cyanurate" -- should read -- triallyl cyanurate --.

Column 11, line 9, "in that order" -- should read -- in the µm order --.

Signed and Sealed this  
Fifth Day of August, 2014

Michelle K. Lee  
*Deputy Director of the United States Patent and Trademark Office*